US010675992B2

(12) United States Patent
Nishiguchi et al.

(10) Patent No.: US 10,675,992 B2
(45) Date of Patent: Jun. 9, 2020

(54) MOUNTING STRUCTURE FOR VEHICLE EQUIPMENT

(71) Applicant: KAWASAKI JUKOGYO KABUSHIKI KAISHA, Hyogo (JP)

(72) Inventors: Nobuyuki Nishiguchi, Irvine, CA (US); Craig Boyd, Rancho Margarita, CA (US)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 89 days.

(21) Appl. No.: 15/906,605

(22) Filed: Feb. 27, 2018

(65) Prior Publication Data

US 2019/0263294 A1    Aug. 29, 2019

(51) Int. Cl.
| | |
|---|---|
| *B60N 2/02* | (2006.01) |
| *B60N 2/015* | (2006.01) |
| *B62D 21/02* | (2006.01) |
| *B60R 7/04* | (2006.01) |
| *B62D 21/18* | (2006.01) |
| *B62D 21/09* | (2006.01) |

(52) U.S. Cl.
CPC ............ *B60N 2/01508* (2013.01); *B60R 7/04* (2013.01); *B62D 21/02* (2013.01); *B62D 21/09* (2013.01); *B62D 21/183* (2013.01)

(58) Field of Classification Search
CPC ............ B60R 16/0373; B60R 16/0315; B60L 2200/26; B60P 3/125; B21D 1/14; B60H 1/3208; B60K 2370/81; G07B 15/063; G08G 1/096716
See application file for complete search history.

(56) References Cited

U.S. PATENT DOCUMENTS

| | | | | |
|---|---|---|---|---|
| 5,944,388 A * | 8/1999 | Saucier | ............. | B60N 2/01591 296/65.01 |
| 6,234,552 B1 * | 5/2001 | Kruger | ............... | B60N 2/01516 248/503.1 |
| 6,598,926 B1 * | 7/2003 | Price | ........................ | B60N 2/06 296/65.09 |
| 6,692,051 B1 * | 2/2004 | Cook | ..................... | B60N 2/062 296/190.01 |
| 6,840,703 B2 * | 1/2005 | Blanchard | ............. | F16B 19/109 248/429 |
| 6,883,853 B2 * | 4/2005 | Otto | .................... | B60N 2/01558 296/65.01 |
| 7,000,990 B1 * | 2/2006 | Liu | ........................ | B60N 2/206 296/65.09 |
| RE39,101 E * | 5/2006 | Miyahara | .................... | 296/65.03 |
| 7,070,223 B2 * | 7/2006 | Jeong | ................. | B60N 2/01583 296/65.03 |
| 7,073,839 B2 * | 7/2006 | Boyina | .............. | B60N 2/01583 296/65.03 |
| 7,118,167 B2 * | 10/2006 | Nakamura | ............. | B62D 21/10 296/193.07 |

(Continued)

*Primary Examiner* — Kiran B Patel
(74) *Attorney, Agent, or Firm* — Wenderoth, Lind & Ponack, L.L.P.

(57) ABSTRACT

A mounting structure for vehicle equipment includes a vehicle body frame, a bracket attached to the vehicle body frame, and a plurality of vehicle equipment including at least one seat. The bracket and the plurality of vehicle equipment are configured so that the plurality of vehicle equipment each is mounted to the bracket so as to be replaceable with the other vehicle equipment.

15 Claims, 12 Drawing Sheets

(56) References Cited

U.S. PATENT DOCUMENTS

| | | | | |
|---|---|---|---|---|
| 7,137,663 B2* | 11/2006 | Tsujibayashi | B60N 2/01583 | 297/15 |
| 7,175,220 B2* | 2/2007 | Kashiwagi | B62J 1/28 | 280/288.4 |
| 7,252,319 B2* | 8/2007 | Toyota | B60N 2/062 | 296/65.09 |
| 7,270,375 B2* | 9/2007 | Lutzka | B60N 2/01583 | 297/331 |
| 7,296,840 B2* | 11/2007 | Martone | B60N 2/01583 | 248/503.1 |
| 7,331,558 B2* | 2/2008 | Jeong | B60N 2/01583 | 248/419 |
| 7,370,832 B2* | 5/2008 | Frantz | B64C 1/20 | 244/118.6 |
| 7,377,570 B2* | 5/2008 | Rondeau | B60N 2/24 | 180/908 |
| 7,419,205 B2* | 9/2008 | Tsukamoto | B60N 2/0155 | 248/503.1 |
| 7,500,707 B2* | 3/2009 | Lutzka | B60N 2/01583 | 296/65.03 |
| 7,552,972 B2* | 6/2009 | Ferrari | B60N 2/01583 | 296/65.09 |
| 7,708,331 B2* | 5/2010 | Yamasaki | B60N 2/062 | 296/65.13 |
| 7,712,829 B2* | 5/2010 | Park | B60N 2/01 | 296/65.13 |
| 7,713,009 B2* | 5/2010 | Hudson | B64D 11/0696 | 410/104 |
| 7,748,766 B2* | 7/2010 | Villeminey | B60N 2/065 | 296/64 |
| 8,033,589 B2* | 10/2011 | Kusanagi | B60N 2/045 | 296/65.07 |
| 8,128,326 B2* | 3/2012 | Hudson | B64D 11/0696 | 410/104 |
| 8,152,215 B1* | 4/2012 | Tsumiyama | B60N 2/015 | 296/63 |
| 8,215,695 B2* | 7/2012 | Ida | B60N 2/01583 | 296/65.03 |
| 8,258,413 B2* | 9/2012 | Ito | G01G 3/1402 | 177/136 |
| 8,616,631 B2* | 12/2013 | Westerink | B60N 2/24 | 297/188.08 |
| 8,801,101 B2* | 8/2014 | Dagcioglu | B60N 2/3011 | 296/65.09 |
| 9,073,451 B1* | 7/2015 | Wurzer | B60N 2/015 | |
| 9,399,411 B2* | 7/2016 | Kosuge | B60N 2/07 | |
| 9,446,687 B2* | 9/2016 | Kamara | B60N 2/015 | |
| 2009/0033122 A1* | 2/2009 | Stefanon | B60N 2/01508 | 296/65.03 |
| 2009/0267376 A1* | 10/2009 | McDermott | B60N 2/01583 | 296/65.03 |
| 2012/0161427 A1* | 6/2012 | Tsumiyama | B60J 5/0487 | 280/781 |

* cited by examiner

MOUNTING STRUCTURE FOR VEHICLE EQUIPMENT

BACKGROUND OF THE INVENTION

Field of the Invention

The present invention relates to a mounting structure for vehicle equipment.

Description of the Related Art

A utility vehicle includes a plurality of seats as vehicle equipment. A utility vehicle with seats for two persons includes a driver's seat and a front passenger seat as front seats, whereas a utility vehicle with seats for four persons includes two front seats as well as two rear seats. Each of the seats is fastened, by means of a fastener such as a bolt, and fixed directly to a vehicle body frame (see U.S. Pat. Nos. 8,152,215 and 9,399,411).

SUMMARY OF THE INVENTION

A seat not in use out of the plurality of seats excluding the driver's seat is occasionally utilized as a storage on which goods are placed. However, the seats are typically designed for seatability of crews and are not necessarily suitable for placing goods. Depending on the number of crews, such two separate left and right seats may preferably be replaced with a bench seat for three persons.

The seats, which are fixed to the vehicle body frame by means of the fasteners, troublesomely need a tool for mounting and dismounting thereof. Furthermore, there is provided no other vehicle equipment to be mounted in place of a removed seat.

The present invention has been made in view of these problems, and an object thereof is to provide a mounting structure for vehicle equipment, enabling vehicle equipment to be mounted in place of a seat and thereby improvement in convenience can be achieved.

In order to achieve this object, the present invention provides a mounting structure for vehicle equipment. The structure includes: a vehicle body frame; a bracket attached to the vehicle body frame; and a plurality of vehicle equipment including at least one seat. The bracket and the plurality of vehicle equipment are configured so that the plurality of vehicle equipment each is mounted to the bracket so as to be replaceable with the other vehicle equipment.

The present invention enables a seat or vehicle equipment in place of the seat to be mounted to the vehicle body frame with the bracket. For example, other vehicle equipment can be mounted in place of a seat not in use and thereby improvement in convenience can be achieved.

The mounting structure for vehicle equipment preferably has any of the following configurations.

(1) The bracket includes a positioning portion positioning the vehicle equipment, and a fixing portion fixing the vehicle equipment. The vehicle equipment includes a positioned-portion positioned by the positioning portion, and a fixed-portion fixed by the fixing portion.

The configuration (1) enables the vehicle equipment to be positioned and fixed to the bracket.

(2) The fixed-portion is positioned at a front portion of the vehicle equipment.

The configuration (2) enables the vehicle equipment to be accessible from ahead for mounting and dismounting thereof. The plurality of vehicle equipment includes the seat. The vehicle equipment is thus mounted positionally correspondingly to the seat. A foot space for a crew is secured in front of the seat. The vehicle equipment can thus be mounted or dismounted easily with use of the foot space.

(3) In the configuration (2), the positioning portion has a pair of left and right side face portions extending in an anteroposterior direction. At least one of the pair of left and right side face portions has a front edge provided with a cut-away portion opened forward. The positioned-portion is configured as an equipment extension disposed at a rear portion of the vehicle equipment and extending in at least one of the anteroposterior direction and a vertical direction. The equipment extension has a pin extending in a vehicle width direction. In a state where the vehicle equipment is mounted to the bracket, the equipment extension is inserted between the pair of left and right side face portions so that the positioned-portion is positioned in a vehicle width direction with respect to the positioning portion. The pin is inserted from ahead to the cut-away portion so that the positioned-portion is positioned in the anteroposterior direction and in the vertical direction with respect to the positioning portion.

The configuration (3) enables the vehicle equipment to easily be positioned with respect to the bracket by disposing the equipment extension between the pair of left and right side face portions and inserting the pin to the cut-away portion.

(4) In the configuration (3), in the state where the positioned-portion of the vehicle equipment is positioned by the positioning portion, the fixed-portion is inserted to the fixing portion in the vertical direction to be fixed in the vertical direction.

The configuration (4) enables the vehicle equipment to readily be fixed to the bracket in the vertical direction.

(5) In the configuration (3), the positioning portion has a cornered U shape portion opened forward in a side view, and a pair of left and right edges configured by lateral ends of a tabular member extending anteroposteriorly. The positioned-portion includes a pipe member disposed at a rear portion of the vehicle equipment and extending in a vehicle width direction, and a pair of left and right equipment extensions attached to a lower surface of the pipe member and extending anteroposteriorly. In a state where the vehicle equipment is mounted to the bracket, the pipe member is inserted from ahead to the cornered U shape portion to be positioned vertically and anteroposteriorly, and the pair of left and right equipment extensions is inserted between the pair of left and right edges to be positioned transversely.

The configuration (5) enables the vehicle equipment to easily be positioned with respect to the bracket by inserting the pipe member to the cornered U shape portion and disposing the equipment extensions between the pair of left and right edges.

(6) In the configuration (5), in the state where the positioned-portion of the vehicle equipment is positioned by the positioning portion, the fixed-portion is inserted anteroposteriorly to the fixing portion to be fixed anteroposteriorly.

The configuration (6) enables the vehicle equipment to readily be fixed to the bracket anteroposteriorly.

(7) In the configuration (1), the positioning portion is configured by at least one vehicle component positioned around the vehicle equipment mounted to the bracket. The positioned-portion is configured by an outer peripheral of the vehicle equipment mounted to the bracket. The vehicle equipment is positioned horizontally with the outer peripheral being positionally restricted by the at least one vehicle component.

The configuration (7) achieves easily positioning the vehicle equipment horizontally by restricting the vehicle equipment with the at least one vehicle component.

(8) The plurality of vehicle equipment includes at least one of a storage plate or a storage box.

The configuration (8) achieves improvement in placement of goods by replacing a seat not in use with the storage plate or the storage box.

(9) The vehicle equipment is placed on the vehicle body frame and has contact portions in contact with the vehicle body frame, and at least one of the contact portions is provided with an elastic member.

The configuration (9) enables the vehicle equipment to be elastically supported on the vehicle body frame to prevent noise due to rattle of the vehicle equipment.

BRIEF DESCRIPTION OF THE DRAWINGS

The foregoing and the other features of the present invention will become apparent from the following description and drawings of an illustrative embodiment of the invention in which.

DETAILED DESCRIPTION OF THE INVENTION

A utility vehicle according to an embodiment of the present invention will now be described with reference to the accompanying drawings. For easier description, assume that the utility vehicle travels "forward" with respect to the utility vehicle and respective components, and right and left sides in the vehicle width direction of a crew correspond to "right and left sides" of the utility vehicle and the respective components.

First Embodiment

Figure 1:
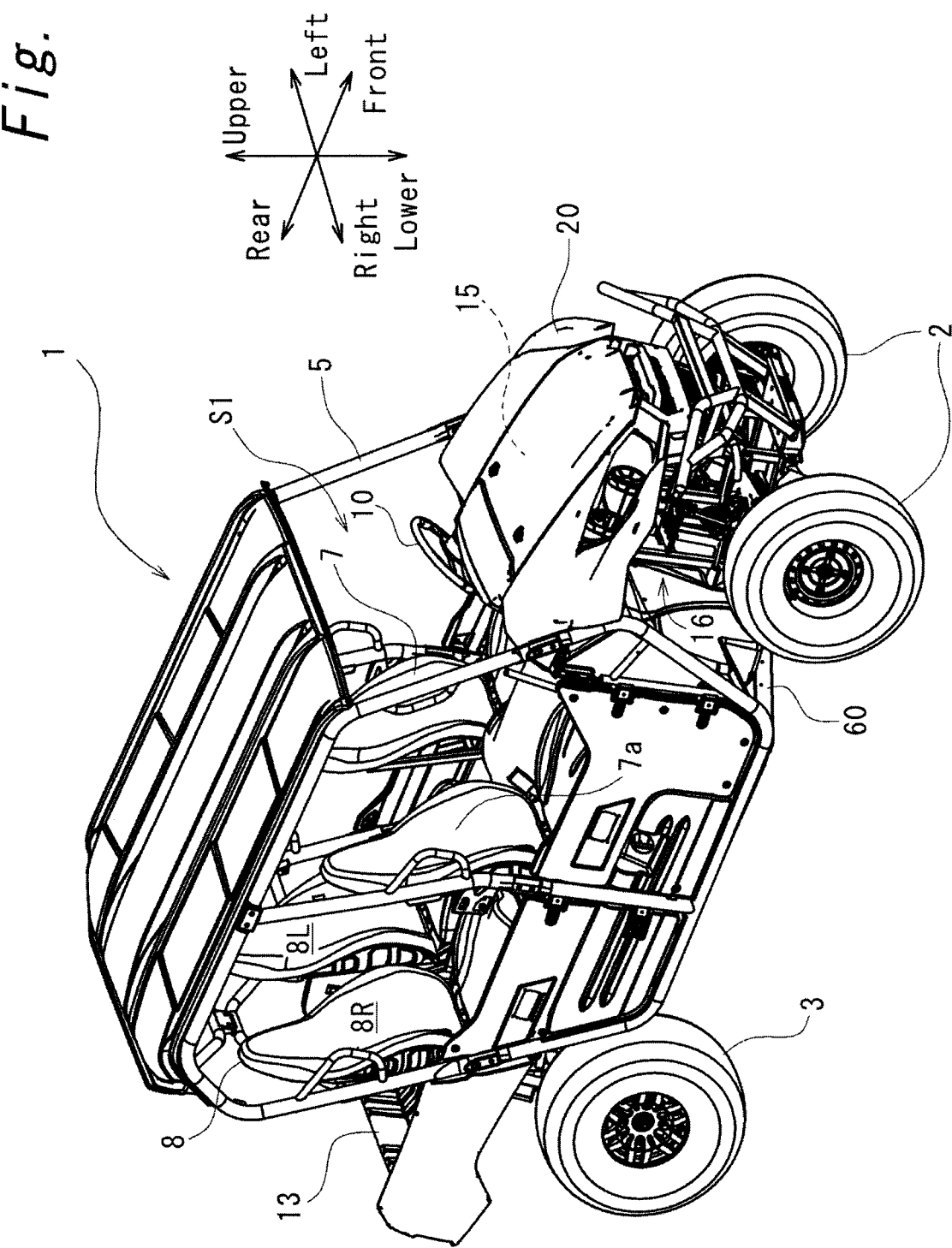
FIG. 1 is a perspective view from ahead, of a utility vehicle including a vehicle equipment mounting structure according to an embodiment of the present invention.

As depicted in FIG. 1, a utility vehicle 1 includes a vehicle body frame 60, left and right front wheels 2 disposed at the front end of the vehicle body frame 60, and left and right rear wheels 3 disposed at the rear end of the vehicle body frame 60. There is a riding space S1 positioned between the front wheels 2 and the rear wheels 3 in the anteroposterior direction and surrounded with a ROPS 5. The riding space S1 contains left and right separate front seats 7 and left and right separate rear seats 8. The riding space S1 is provided at the front end with a steering wheel 10, and the rear seats 8 are provided therebelow with an engine (not depicted). The ROPS is an abbreviation for a rollover protective structure.

The utility vehicle further includes a cargo bed 13 disposed behind the riding space S1, and a front cover assembly 20 disposed ahead of the riding space S1 and covering a front chamber 15 as well as left and right wheel housings 16.

Figure 2:
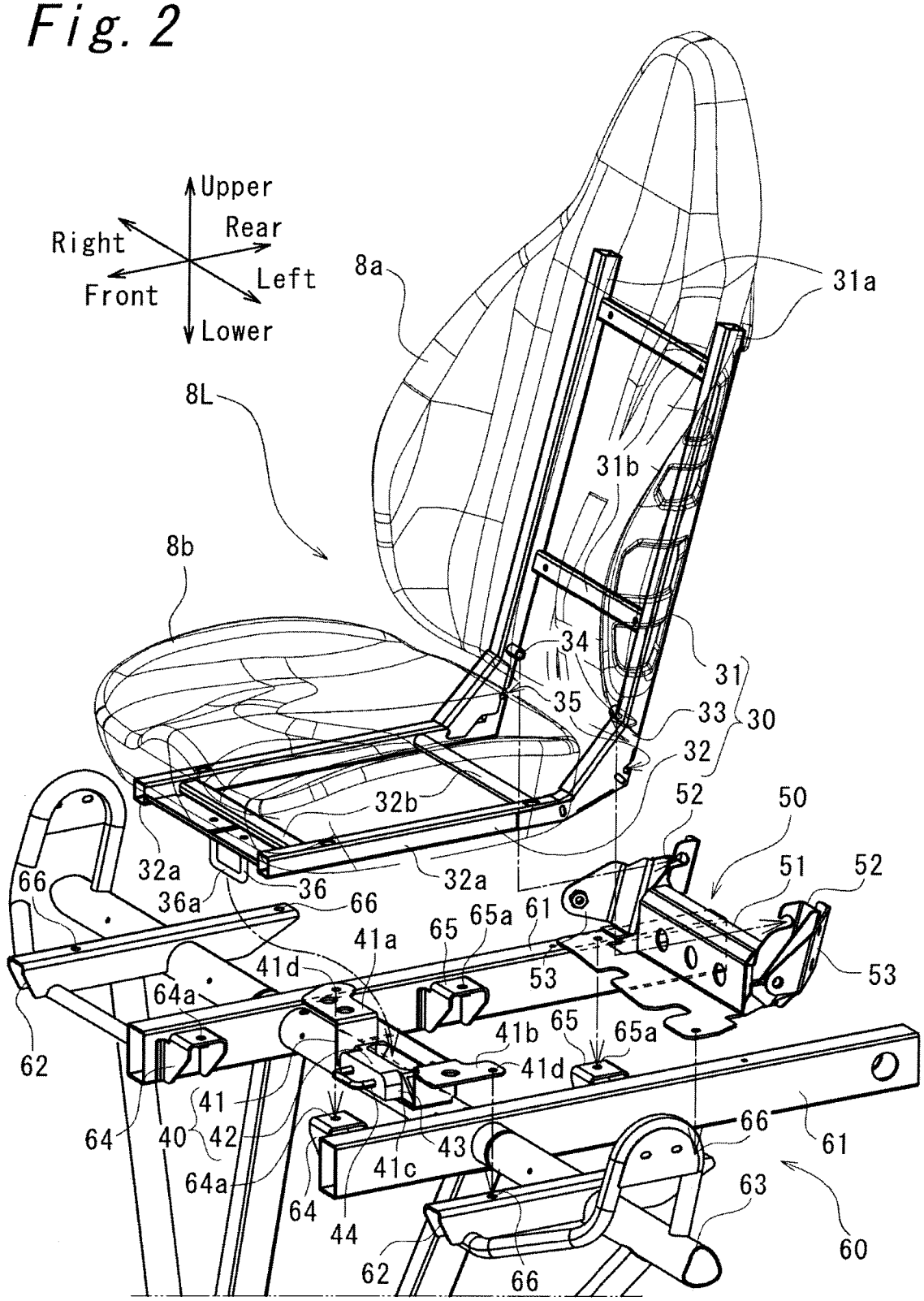
FIG. 2 is an exploded perspective view of a seat mounting structure according to a first embodiment.

FIG. 2 is an exploded perspective view of a mounting structure for a left rear seat 8L to the vehicle body frame 60. Each of a pair of left and right rear seats 8L and 8R is configured to be mounted to the vehicle body frame 60 with a pair of front and rear mounting brackets 40 and 50. The left rear seat 8L in FIG. 2 includes a seat back 8a and a seat cushion 8b depicted with thin lines, as well as an internal seat frame 30 being visualized. FIG. 2 does not depict the right rear seat 8R, the mounting brackets 40 and 50 for the rear seat 8R, and a floor panel configuring a floor surface of the riding space S1.

The mounting structure for vehicle equipment according to an embodiment of the present invention will be described below, exemplifying the left rear seat 8L.

(Vehicle Body Frame 60)

The vehicle body frame 60 includes a pair of left and right seat longitudinal main frames 61 disposed at the center in the vehicle width direction and extending in the anteroposterior direction, a pair of left and right seat longitudinal sub frames 62 disposed outside the seat longitudinal main frames 61 in the vehicle width direction and extending in the anteroposterior direction, and a seat cross member 63 extending in the vehicle width direction and penetrating the pair of left and right seat longitudinal main frames 61 and the pair of left and right seat longitudinal sub frames 62.

The seat longitudinal main frames 61 are pipe members having a rectangular cross section, and extend backward from the front end of the seat cushion 8b beyond the rear end thereof. The seat longitudinal main frames 61 have an inner side face portion in the vehicle width direction, to each of which a front base bracket 64 and a rear base bracket 65 in a pair are attached. The front and rear base brackets 64 and 65 have a cornered U cross section opened downward, and are provided, in the top surfaces extending substantially horizontally, with attachment holes 64a and 65a, respectively.

The seat longitudinal sub frames 62 have a cornered U cross section opened downward, and extend in the anteroposterior direction substantially from the front end to the rear end of the seat cushion 8b. The seat longitudinal sub frames 62 are each provided, in the top surface, with a pair of front and rear attachment holes 66.

(Front Mounting Bracket 40)

The front mounting bracket 40 includes a bracket body 41, and a fixing portion 42 attached to the bracket body 41.

The bracket body 41 has a invert-hat shaped cross section opened upward in a front view, and extends in the vehicle width direction between the seat longitudinal main frame 61 and the seat longitudinal sub frame 62. Specifically, the bracket body 41 has a first flange 41a attached onto the top surface of the front base bracket 64, a second flange 41b attached to a front portion of the top surface of the seat longitudinal sub frame 62, and a lower face portion 41*c* positioned between the first and second flanges 41*a* and 41*b* and stepped downward from the first and second flanges 41*a* and 41*b*.

Figure 3:
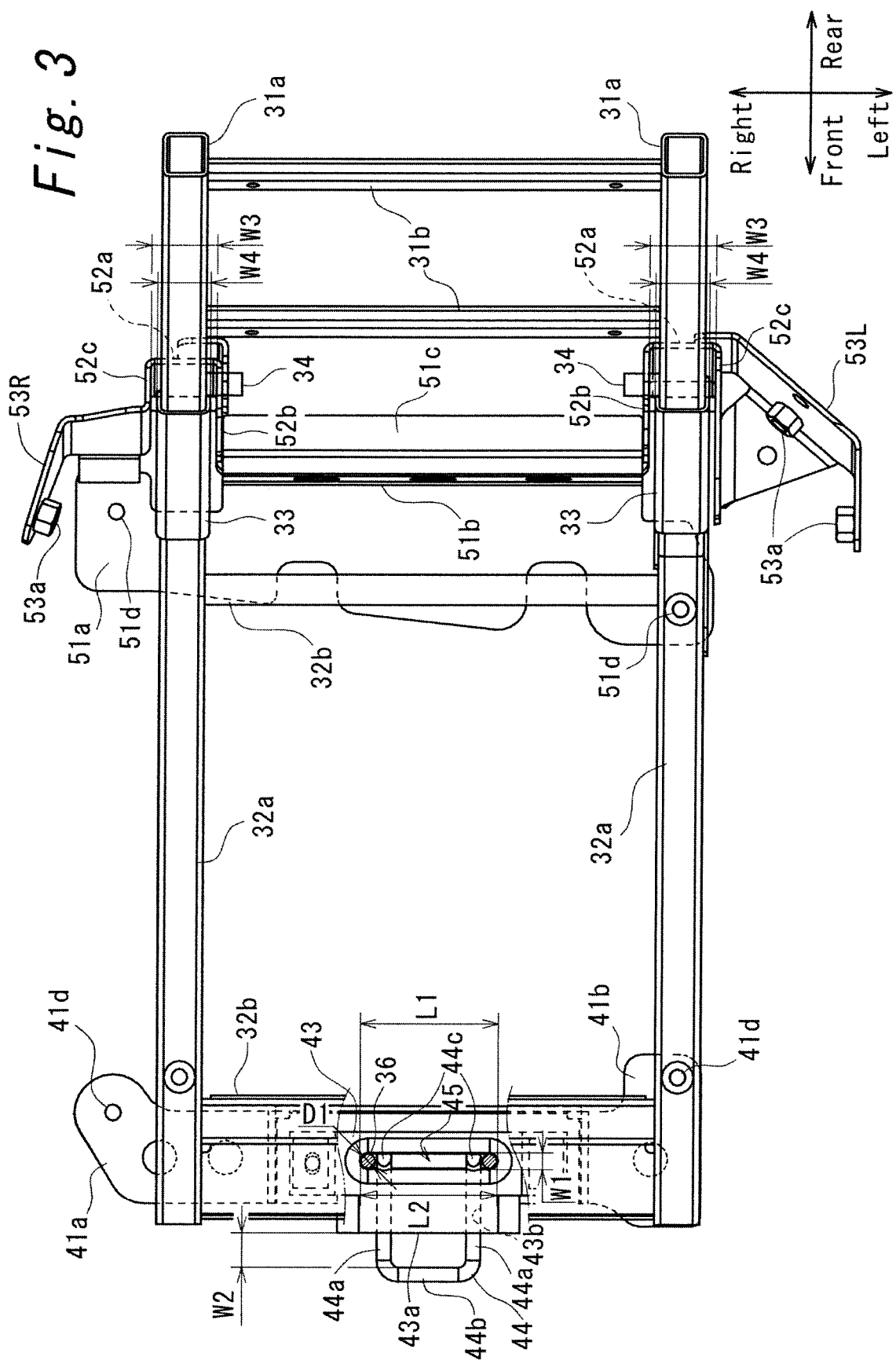
FIG. 3 is a plan view of the seat mounting structure.

The fixing portion 42 is fastened to be attached onto the lower face portion 41*c* of the bracket body 41, and includes a fixing portion body 43 and an engagement pin 44. FIG. 3 is a plan view of a mounting structure for the left rear seat 8L to the front and rear mounting brackets 40 and 50. With reference also to FIG. 3, the fixing portion body 43 is shaped into a block shape and is provided, in the top surface, with an engagement groove 45 extending in the vehicle width direction and opened upward.

The engagement groove 45 has a groove width W1 and a groove length L1 substantially equal to or slightly longer than a bar diameter D1 and a transverse length L2 of a seat striker 36 to be described later, respectively. More specifically, the engagement groove 45 is sized to fit the seat striker 36 therein in a planar view. The fixing portion body 43 is provided with a pair of left and right through holes 43*b* penetrating from a front wall face portion 43*a* to the engagement groove 45. The engagement groove 45 has an upper open edge being chamfered.

The engagement pin 44 is formed by bending a round bar into a substantially U shape opened backward, and has a pair of left and right anteroposterior portions 44*a* extending in the anteroposterior direction and a cross portion 44*b* extending in the vehicle width direction and connecting the front ends of the anteroposterior portions 44*a*. The pair of left and right anteroposterior portions 44*a* of the engagement pin 44 is inserted from ahead to penetrate the pair of through holes 43*b*, and is assembled to the fixing portion body 43.

The engagement pin 44 is biased backward by a biasing member (not depicted) and has rear ends 44*c* anteroposteriorly positioned by a rear groove wall defining the engagement groove 45. The rear ends 44*c* have portions positioned in the engagement groove 45 and chamfered so as to be inclined downwardly towards rear end thereof.

In a state where the engagement pin 44 is assembled to the fixing portion body 43 with the rear ends 44*c* positioned by the groove wall, the cross portion 44*b* faces the front wall face portion 43*a* of the fixing portion body 43 with a predetermined gap W2 therebetween. The predetermined gap W2 is sized to allow entrance of at least a fingertip.

As depicted in FIG. 2, the front mounting bracket 40 is attached to the front base bracket 64 and the top surface of the seat longitudinal sub frame 62 with fastening bolts (not depicted) inserted through attachment holes 41*d* in the first and second flanges 41*a* and 41*b* and fastened to the attachment holes 64*a* and 66.

(Rear Mounting Bracket 50)

Figure 4:
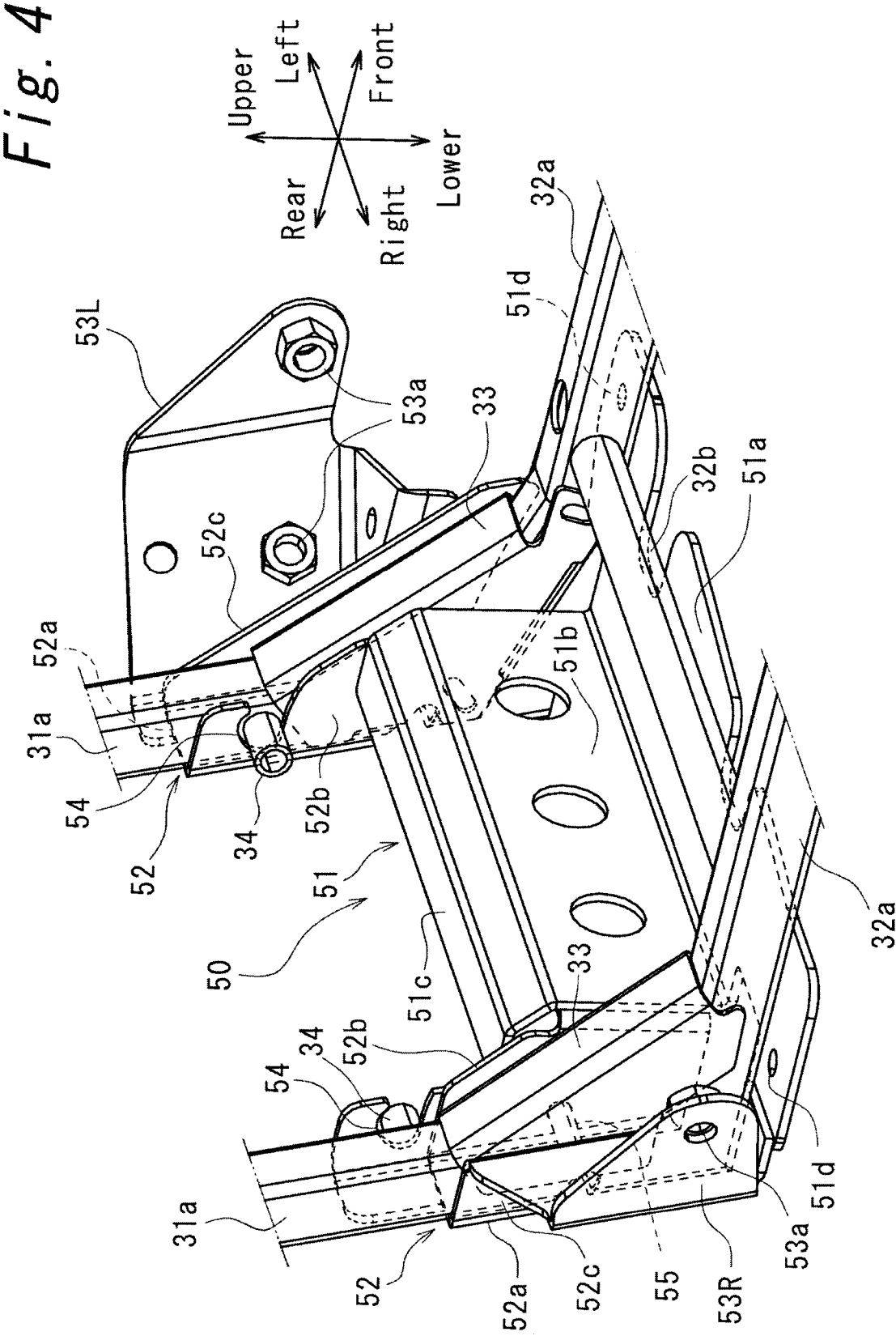
FIG. 4 is a perspective view of positioning portions and positioned-portions in the seat mounting structure.

FIG. 4 is a perspective view of the rear mounting bracket 50 and the vicinity thereof, with the seat frame 30 attached thereto. The rear mounting bracket 50 includes a bracket body 51, positioning portions 52, and equipment mounting brackets 53.

With reference also to FIG. 2, the bracket body 51 includes a base flange 51*a* extending in the vehicle width direction over the top surface of the rear base bracket 65 and the top surface of the seat longitudinal sub frame 62 and attached thereto, a rear face portion 51*b* extending upward from the rear end of the base flange 51*a*, and an upper face portion 51*c* extending backward from the upper end of the rear face portion 51*b*.

A pair of positioning portions 52 are provided at respective lateral ends in the width direction of the bracket body 51. Each of the pair of left and right positioning portions 52 has a rear face portion 52*a* directed anteroposteriorly, and a pair of left and right, first and second side face portions 52*b* and 52*c* extending forward from respective lateral ends in the width direction of the rear face portion 52*a*, to form a cornered U cross section opened forward.

The rear face portion 52*a* extends slantedly backward toward an upper end thereof. The first side face portion 52*b* is positioned inside in the width direction of the rear seat 8L. The second side face portion 52*c* is positioned outside in the width direction of the rear seat 8L. The first side face portions 52*b* of the positioning portions 52 are firmly fixed by welding or the like to lateral ends in the width direction of the rear face portion 51*b* and the upper face portion 51*c*, respectively.

As depicted in FIG. 3, the positioning portions 52 are each sized such that a width W3 in the vehicle width direction between the first side face portion 52*b* and the second side face portion 52*c* is larger than a width W4 of gussets 33 of the seat frame 30 to be described later, more specifically, the width W3 allows each of the gussets 33 to be fitted therein. As depicted in FIG. 4, the first side face portion 52*b* has a front edge provided with a cut-away portion 54 opened forward. The cut-away portion 54 has a cut-away width at the front end in a side view smaller than a cut-away width at the remaining portion, and has an upper edge defining the cut-away portion 54 and curved downward toward the front end.

The positioning portions 52 are each provided, below the cut-away portion 54, with a connection pin 55 connecting the first and second side face portions 52*b* and 52*c* in the vehicle width direction. The connection pin 55 is a round bar.

A pair of the equipment mounting brackets 53 in a pair are provided outside the pair of left and right positioning portions 52 in the width direction of the seat. With reference also to FIG. 3, a left equipment mounting bracket 53L is firmly fixed by welding or the like to the rear face portion 52*a* and the second side face portion 52*c* of the left positioning portion 52, and extends outward in the width direction of the rear seat 8L as well as forward while being bent forward.

A right equipment mounting bracket 53R is formed integrally with the second side face portion 52*c* to extend while bending outward in the width direction of the rear seat 8L from the front end of the second side face portion 52*c* of the right positioning portion 52 and extend forward while bending forward, and has a lower end firmly fixed by welding or the like onto the base flange 51*a*.

Each of the pair of left and right equipment mounting brackets 53 has an equipment mounting portion 53*a* that is provided at the portion extending in the vehicle width direction or the portion extending forward and is configured to mount vehicle equipment (not depicted). The equipment mounting portion 53*a* is configured to mount various equipment. In a case where a seatbelt is mounted to the equipment mounting portion 53*a*, the seatbelt is mounted more firmly to the rear mounting bracket 50 fastened and fixed to the vehicle body frame 60 than being fixed to the rear seat 8L which is easily mounted to and dismounted from the vehicle body frame 60.

As depicted in FIG. 2, the rear mounting bracket 50 is attached to the rear base bracket 65 and the top surface of the seat longitudinal sub frame 62 with fastening bolts (not depicted) inserted through attachment holes 51*d* in the base flange 51*a* and fastened to the attachment holes 65*a* and 66.

(Seat Frame 30)

As depicted in FIG. 2, the seat frame 30 includes an upper seat frame 31 supporting the seat back 8a, a bottom seat frame 32 supporting the seat cushion 8b, and the gussets 33 (equipment extensions) reinforcing joints between the upper seat frame 31 and the bottom seat frame 32.

The upper seat frame 31 is configured by a plurality of square pipes, and includes a pair of left and right upper pipes 31a extending slantedly backward toward a front end thereof, and upper cross pipes 31b connecting, in the vehicle width direction, upper portions and lower portions of the upper pipes 31a.

Each of the pair of left and right upper pipes 31a has the lower portion provided, at an inner side surface in the width direction of the rear seat 8L, with a positioning pin 34 extending inward in the width direction. Each of the pair of left and right upper pipes 31a is provided, below the positioning pin 34, with a cut-away portion 35 opened backward and penetrating in the vehicle width direction. The cut-away portion 35, in a side view, extends slantedly upward toward a rear end thereof.

The bottom seat frame 32 is configured by a plurality of square pipes, and includes a pair of left and right bottom pipes 32a extending forward from the lower end of the upper seat frame 31, and a pair of front and rear bottom cross pipes 32b connecting, in the transverse direction, front portions and rear portions of the bottom pipes 32a. The front bottom cross pipe 32b has a lower surface provided with the seat striker 36 serving as a fixed-portion.

Each of the gussets 33 has a cornered U cross section opened backward and downward, to cover, from ahead and above, the joint between the upper pipe 31a and the bottom pipe 32a. Each of the gussets 33 have a top surface directed anteroposteriorly and extending slantedly backward toward an upper end thereof. The gussets 33 each serve as a positioned-portion to be positioned by the positioning portion 52. As described above, the width W4 is smaller than the width W3 between the first side face portion 52b and the second side face portion 52c of the positioning portion 52.

The seat striker 36 is positioned correspondingly to the engagement groove 45 in a planar view in the state where the rear seat 8L is assembled. The seat striker 36 is formed by bending a round bar into a U shape opened upward in a front view.

As depicted in FIG. 3, the seat striker 36 has the bar diameter D1 substantially equal to and slightly smaller than the groove width W1 of the engagement groove 45, and the transverse length L2 substantially equal to and slightly smaller than the groove length L1 of the engagement groove 45. In other words, the seat striker 36 is sized to fit in the engagement groove 45 without rattle when inserted to the engagement groove 45 from above.

Figure 5A:
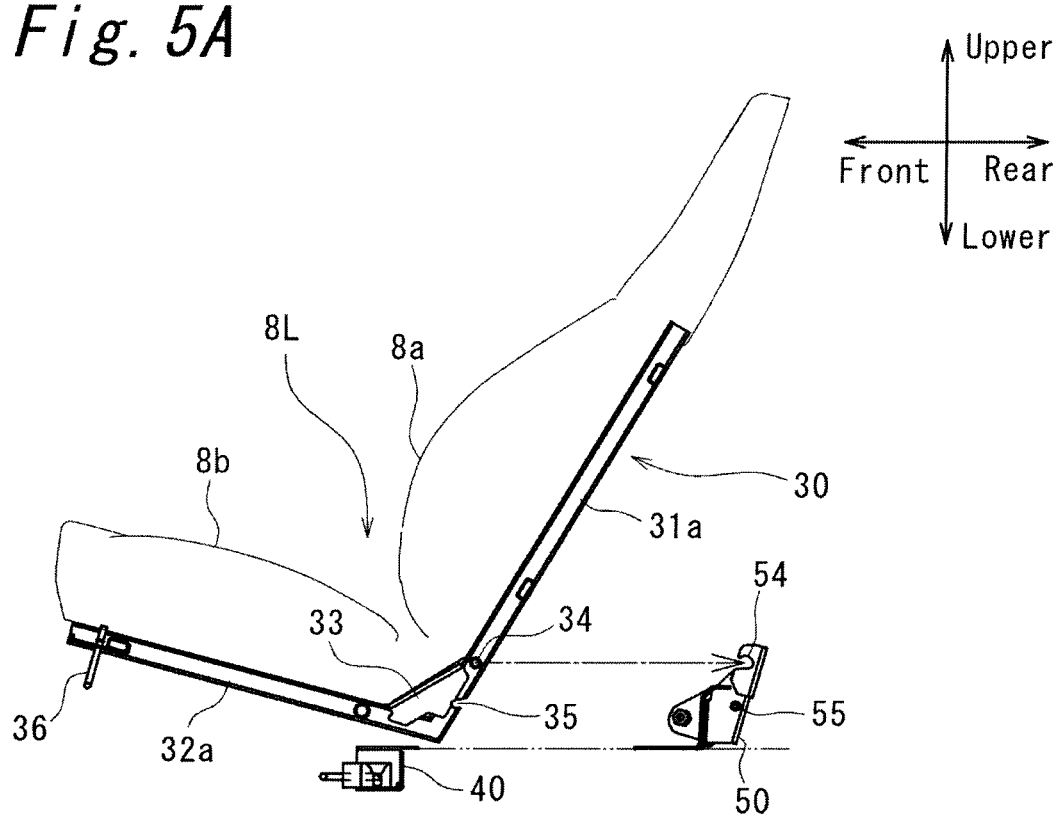
FIGS. 5A and 5B are side views depicting a seat mounting method.
Figure 5B:
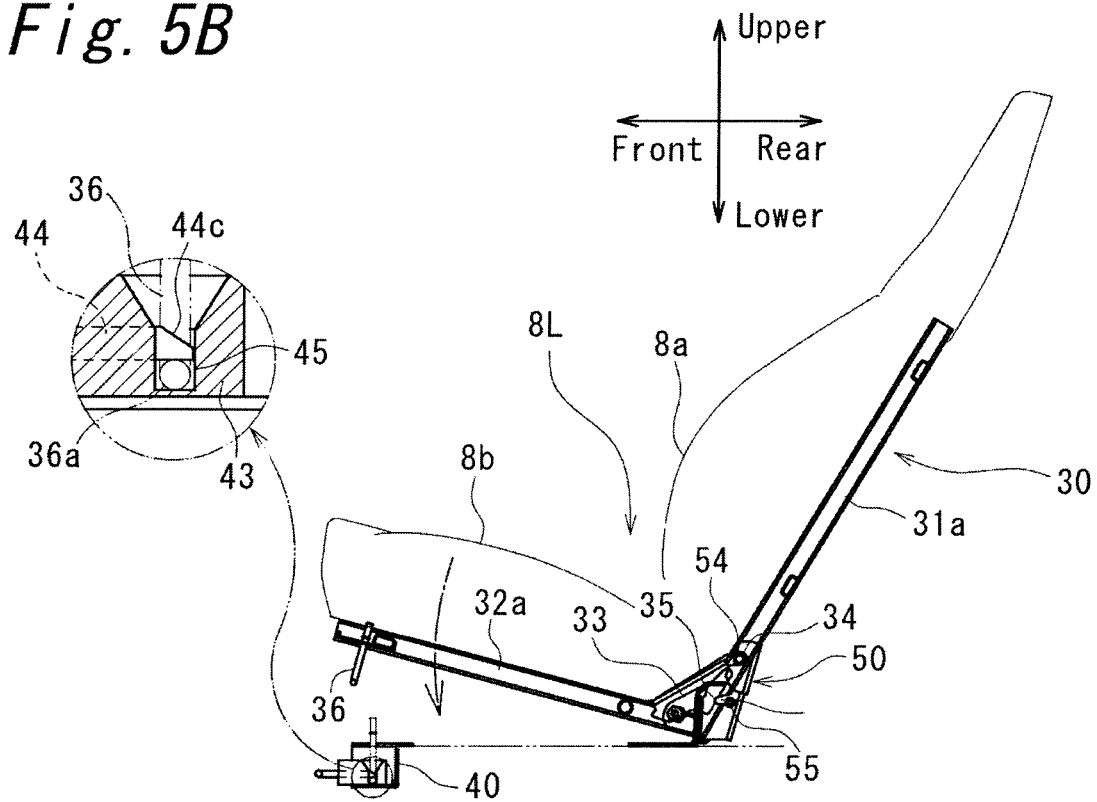

Described next is a method of assembling the rear seat 8L with reference to FIGS. 5A and 5B. FIGS. 5A and 5B depict, similarly to FIG. 2, the seat back 8a and the seat cushion 8b of the rear seat 8L with thin lines, and the seat frame 30 being visualized. FIGS. 5A and 5B are longitudinal sectional views in the anteroposterior direction at the center in the width direction, of the rear seat 8L and the front and rear mounting brackets 40 and 50.

With reference initially to FIG. 5A, the rear seat 8L is brought closer from ahead to the rear mounting bracket 50, with the seat cushion 8b being kept slanted upward toward the front end thereof. Subsequently with reference also to FIG. 4, each of the pair of left and right gussets 33 of the seat frame 30 is positionally adjusted in the vehicle width direction and inserted between the first and second side face portions 52b and 52c of corresponding one of the pair of left and right positioning portions 52 so that the seat frame 30 is positioned in the vehicle width direction with respect to the rear mounting bracket 50.

As described above, the width W3 between the first and second side face portions 52b and 52c is sized to fit the gusset 33 therebetween. The gusset 33 can thus be inserted in the cornered U cross section of the positioning portion 52.

The seat frame 30 is subsequently positionally adjusted in the height direction and is pressed backward into the cornered U cross sections, so that the positioning pins 34 provided at the seat frame 30 are each engaged in the cut-away portion 54 of the positioning portion 52 to be positioned at the rear end of the cut-away portion 54. The seat frame 30 is thus positioned anteroposteriorly and vertically with respect to the rear mounting bracket 50.

In the rear seat 8L in this state as depicted in FIG. 5B, the seat cushion 8b is kept slanted upward toward the front end and the gussets 33 of the seat frame 30 are positioned anteroposteriorly, transversely, and vertically with respect to the rear mounting bracket 50.

In this state, a front portion of the seat cushion 8b of the rear seat 8L is pulled downward about an axis of the positioning pins 34 of the seat frame 30 positioned by the cut-away portions 54 of the rear mounting bracket 50 and the seat striker 36 is inserted from above to the engagement groove 45 of the front mounting bracket 40 to be engaged therewith. The cut-away portions 35 of the seat frame 30 are engaged, from ahead, with the connection pins 55 at the positioning portions 52, to position the seat frame 30 in a rotational direction about the positioning pins 34 of the seat frame 30.

The seat striker 36 presses downward the chamfered portions provided at the rear ends 44c of the engagement pin 44 in the engagement groove 45, withdraws the engagement pin 44 forward from the engagement groove 45, and is pressed downward beyond the engagement pin 44 to be positioned at the groove bottom of the engagement groove 45.

When the seat striker 36 is positioned below the engagement pin 44, the engagement pin 44 is biased by the biasing member to project to an original position (backward) and be positioned substantially in contact with an upper portion of a cross portion 36a of the seat striker 36. Accordingly, the seat striker 36 is inhibited from shifting upward by the engagement pin 44 and is inhibited from shifting downward by the groove bottom surface of the engagement groove 45, to be vertically positioned and fixed with respect to the front mounting bracket 40.

As depicted in FIG. 3, the groove width W1 of the engagement groove 45 is sized to fit the seat striker 36 therein in a planar view as described above. The front mounting bracket 40 thus positions the seat striker 36 anteroposteriorly and transversely.

In the rear seat 8L, a rear portion is positioned vertically, transversely, and anteroposteriorly with respect to the rear mounting bracket 50 and a front portion is fixed vertically and positioned anteroposteriorly and transversely with respect to the front mounting bracket 40. In other words, the rear seat 8L can be positioned and fixed with respect to the front mounting bracket 40 and the rear mounting bracket 50 readily without use of any fastener or any tool.

In order to dismount the rear seat 8L, the cross portion 44b of the engagement pin 44 is gripped and pulled forward to withdraw the engagement pin 44 from the engagement groove 45, and the front portion of the seat cushion 8b is then pulled upward to extract the seat striker 36 from the engagement groove 45. The rear seat 8L is thus disengaged from the fixing portion 42 at the front portion, and is subsequently extracted forward so as to allow the rear portion to be extracted from the rear mounting bracket 50.

Figure 6:
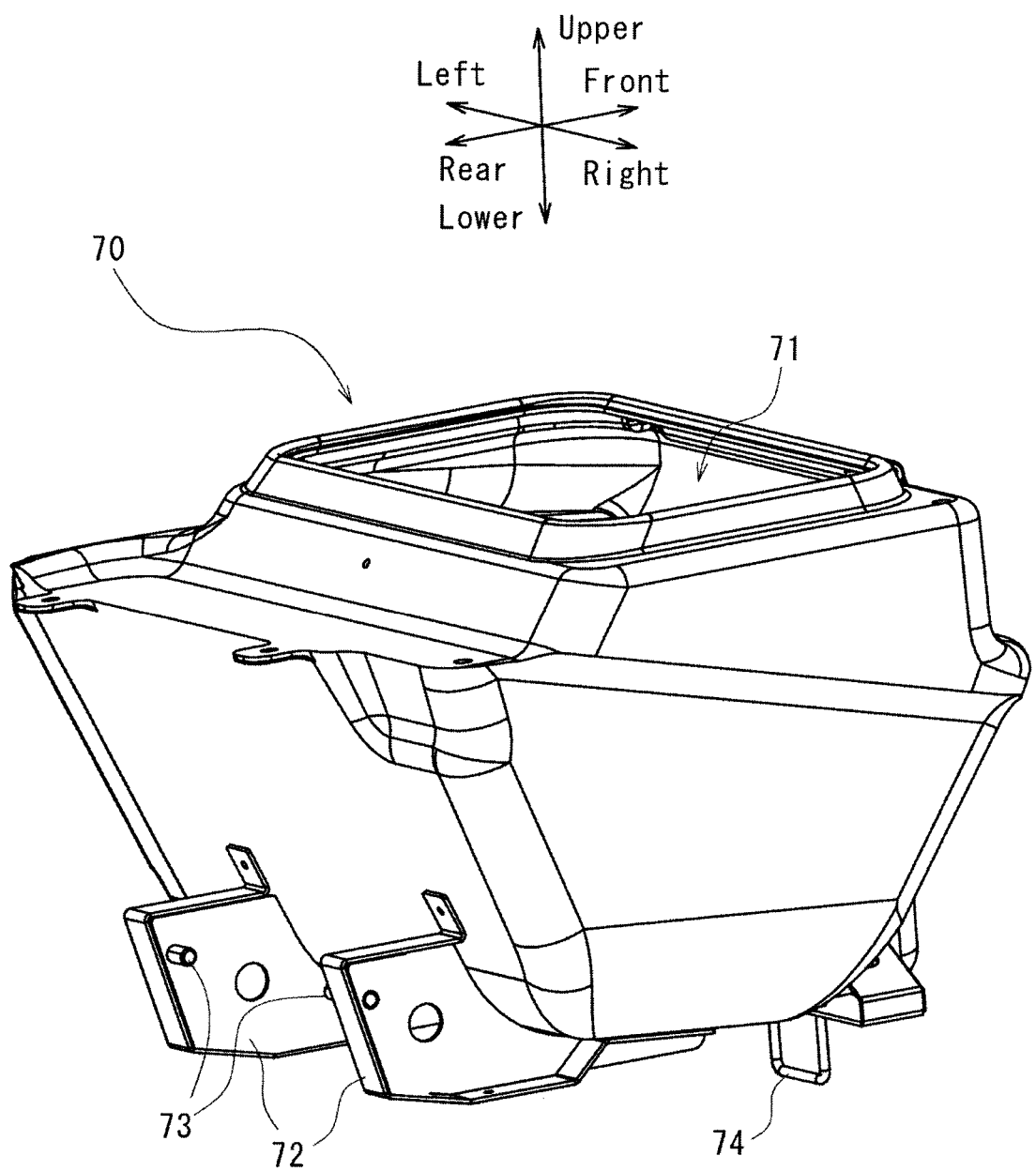
FIG. 6 is a perspective view of a storage box exemplifying the vehicle equipment.
Figure 7:
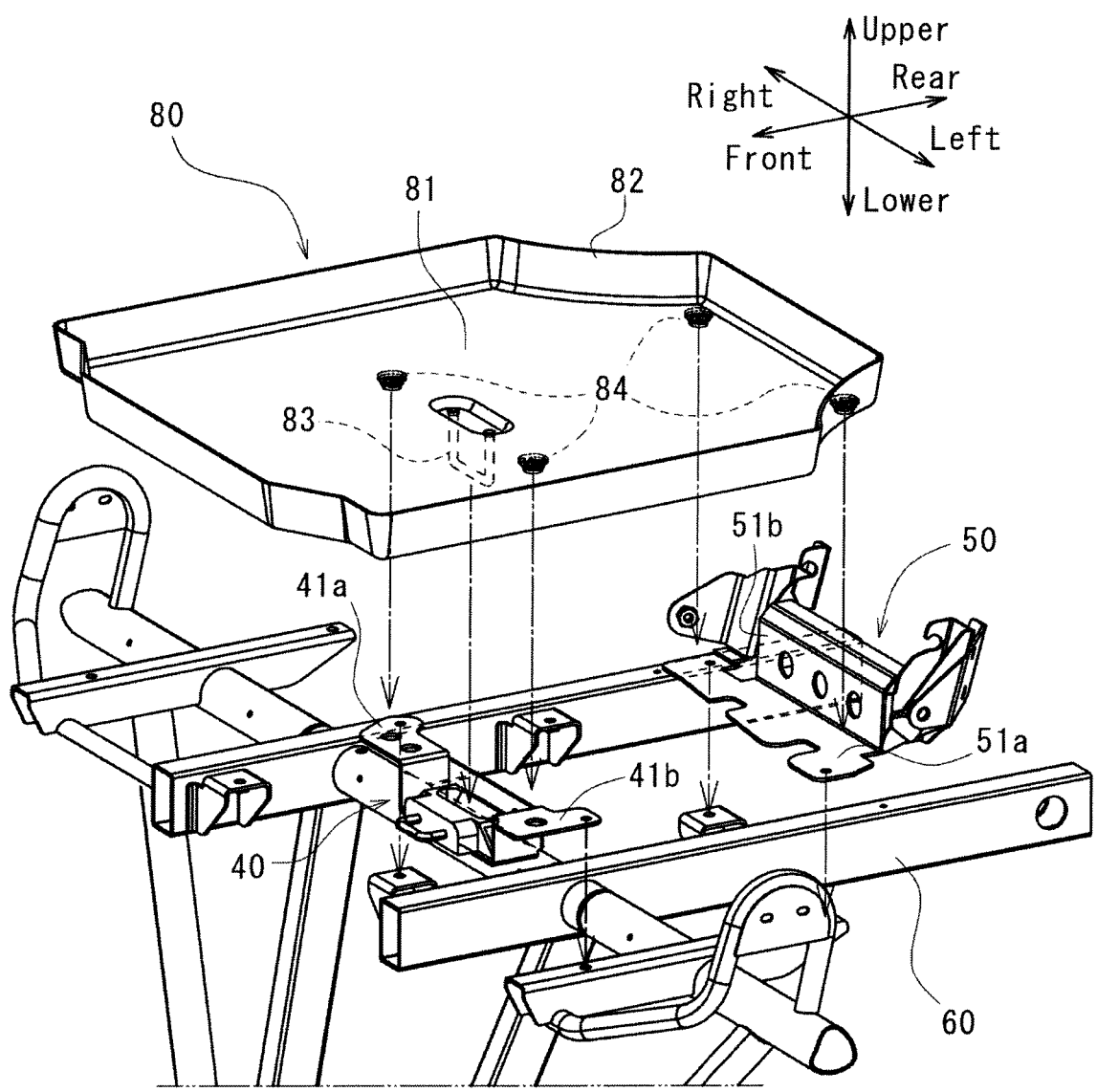
FIG. 7 is an exploded perspective view of a mounting structure for a storage plate exemplifying the vehicle equipment.
Figure 8:
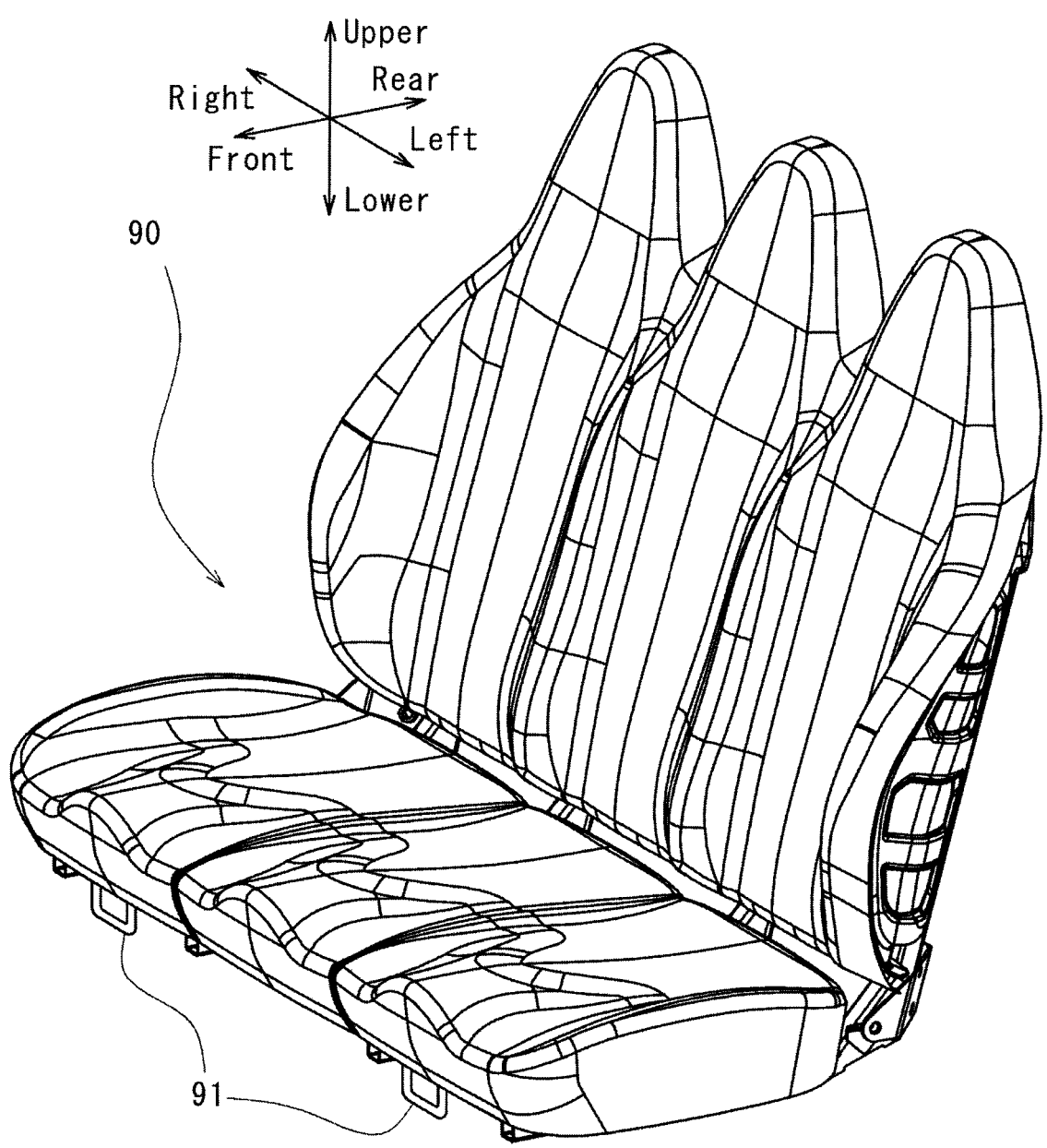
FIG. 8 is a perspective view of a bench seat exemplifying the vehicle equipment.

The rear seat 8L thus becomes replaceable with other vehicle equipment depicted in any one of FIGS. 6 to 8. Examples of the other vehicle equipment include a storage box 70 disclosed as in FIG. 6, a storage plate 80 disclosed as in FIG. 7, and a bench seat 90 for three persons disclosed as in FIG. 8.

With reference to FIG. 6, the storage box 70 has a box shape having an upper end opening 71, and is configured to contain goods. The storage box 70 has a rear end provided with a pair of left and right equipment extensions 72 extending backward, and a pair of left and right positioning pins 73 extending inward in the width direction from inner side surfaces of the equipment extensions 72.

The equipment extensions 72 of the storage box 70 depicted in FIG. 6 are provided with no cut-away portion, and the rear mounting bracket 50 is accordingly provided with no connection pin 55 (not depicted). The equipment extensions 72 can alternatively be provided with cut-away portions as in the rear seat 8L, such that the cut-away portions can be engaged with the connection pins 55 of the rear mounting bracket 50.

Each of the pair of left and right equipment extensions 72 is inserted between the first and second side face portions 52b and 52c of the positioning portion 52, and the positioning pins 73 are inserted to the cut-away portions 54. A rear portion of the storage box 70 is thus positioned vertically, transversely, and anteroposteriorly with respect to the rear mounting bracket 50.

The storage box 70 has a front portion provided with a striker 74, and is thus fixed vertically to the fixing portion 42 of the front mounting bracket 40 by means of the striker 74 and is positioned anteroposteriorly and transversely.

With reference to FIG. 7, the storage plate 80 includes a plate body 81 extending horizontally, an outer peripheral wall 82 provided at the outer peripheral of the plate body 81 and extending upward, a striker 83 provided at the lower surface of the plate body 81, and dampers 84 provided at the lower surface of the plate body 81. The storage plate 80 allows goods to be placed on the plate body 81, and the outer peripheral wall 82 prevents the goods placed on the plate body 81 from dropping off the storage plate 80.

The storage plate 80 is horizontally positioned by the outer peripheral wall 82. Specifically, a rear portion of the outer peripheral wall 82 in the storage plate 80 is restricted from shifting backward by the rear face portion 51b of the rear mounting bracket 50 facing the rear portion. A front portion of the outer peripheral wall 82 is restricted from shifting forward by a seat back 7a of the front seat 7 facing the front portion. Furthermore, side portions of the outer peripheral wall 82 are restricted from shifting in the vehicle width direction by the ROPS 5 facing the side portions.

Moreover, the striker 83 is engaged with the fixing portion 42 of the front mounting bracket 40 to position the storage plate 80 anteroposteriorly and transversely and fix the storage plate 80 vertically.

The plate body 81 of the storage plate 80 is placed on the first and second flanges 41a and 41b of the front mounting bracket 40 and on the base flange 51a of the rear mounting bracket 50, and the dampers 84 are interposed at contact portions thereof. The dampers 84 are elastic members made of rubber or the like, and elastically support the storage plate 80 on the vehicle body frame 60.

With reference to FIG. 8, the bench seat 90 can be seated by three persons, and includes a pair of left and right seat strikers 91 provided at the front lower end, a pair of left and right seat frames 30 and positioning pins 34 provided respectively at the upper pipes (not depicted). The bench seat 90 is mounted, in place of the pair of left and right rear seats 8, by means of the pair of left and right front mounting brackets 40 and the pair of left and right rear mounting brackets 50 provided at the vehicle body frame.

In other words, the plurality of vehicle equipment includes the left and right separate rear seats 8, the storage box 70, the storage plate 80, and the bench seat 90. These vehicle equipment are replaceably mounted to the vehicle body frame 60 by means of the front mounting brackets 40 and the rear mounting brackets 50 so as to be replaceable with the other vehicle equipment.

The mounting structure for vehicle equipment described above achieves the following effects.

(1) The rear seat 8 or other vehicle equipment in place of the rear seat 8 can be mounted to the vehicle body frame 60 by means of the front mounting bracket 40 and the rear mounting bracket 50. For example, the rear seat 8 not in use can be replaced with other vehicle equipment such as the storage box 70 or the storage plate 80 and thereby improvement in placement of goods can be achieved, or the rear seats 8 not in use can be replaced with the bench seat 90, which enables an increase in crew number, and thereby improvement in convenience can be achieved.

(2) The rear seat 8 includes the seat striker 36 serving as the fixed-portion and disposed at the front portion. The fixed-portion of the rear seat 8L is easily accessible from a foot space for a crew corresponding to the rear seat 8, to facilitate mounting and dismounting the rear seat 8L.

(3) The rear seat 8 can be easily positioned anteroposteriorly, transversely, and vertically with respect to the rear mounting bracket 50 by inserting the gussets 33 between the pair of first and second side face portions 52b and 52c and inserting the positioning pins 34 to the cut-away portions 54.

(4) In the state where the rear portion of the rear seat 8 is positioned by the rear mounting bracket 50 and the seat cushion 8b is kept slanted upward toward the front end thereof, the rear seat 8 can readily be fixed to the front mounting bracket 40 by pulling downward the seat cushion 8b to engage the seat striker 36 with the engagement pin 44 in the engagement groove 45 of the fixing portion 42.

(5) Horizontal shift of the outer peripheral wall 82 of the storage plate 80 is restricted by other peripheral vehicle components (the rear face portion 51b of the rear mounting bracket 50, the seat back 7a of the front seat 7, and the ROPS 5 in the above embodiment), to easily position the storage plate 80 horizontally.

(6) The storage box 70 or the storage plate 80 assembled in place of the rear seat 8 improves placement of goods.

(7) The storage plate 80 is elastically supported on the vehicle body frame 60 via the dampers 84, to prevent noise due to rattle of the storage plate 80.

The above embodiment exemplifies provision of the pair of left and right positioning portions 52. The present invention is not limited to this case and can alternatively provide only one of the positioning portions 52. The positioned-portions can alternatively be provided at the upper pipes 31a or the bottom pipes 32a, in place of the gussets 33.

The above embodiment exemplarily refers to the rear seat 8. The present invention is applicable also to the front seats 7. For example, the storage box 70 or the storage plate 80 can be assembled in place of the front passenger seat 7.

The above embodiment exemplifies, as vehicle equipment, the rear seat 8, the storage box 70, the storage plate 80, and the bench seat 90. The present invention is not limited thereto and is applicable also to various vehicle equipment.

Second Embodiment

A mounting structure for vehicle equipment according to the second embodiment will be described with reference to FIGS. 9 to 12. The following description will mainly refer to differences from the mounting structure for vehicle equipment according to the first embodiment, whereas common portions will be denoted by the same reference signs as those of the first embodiment and will not be described repeatedly.

Figure 9:
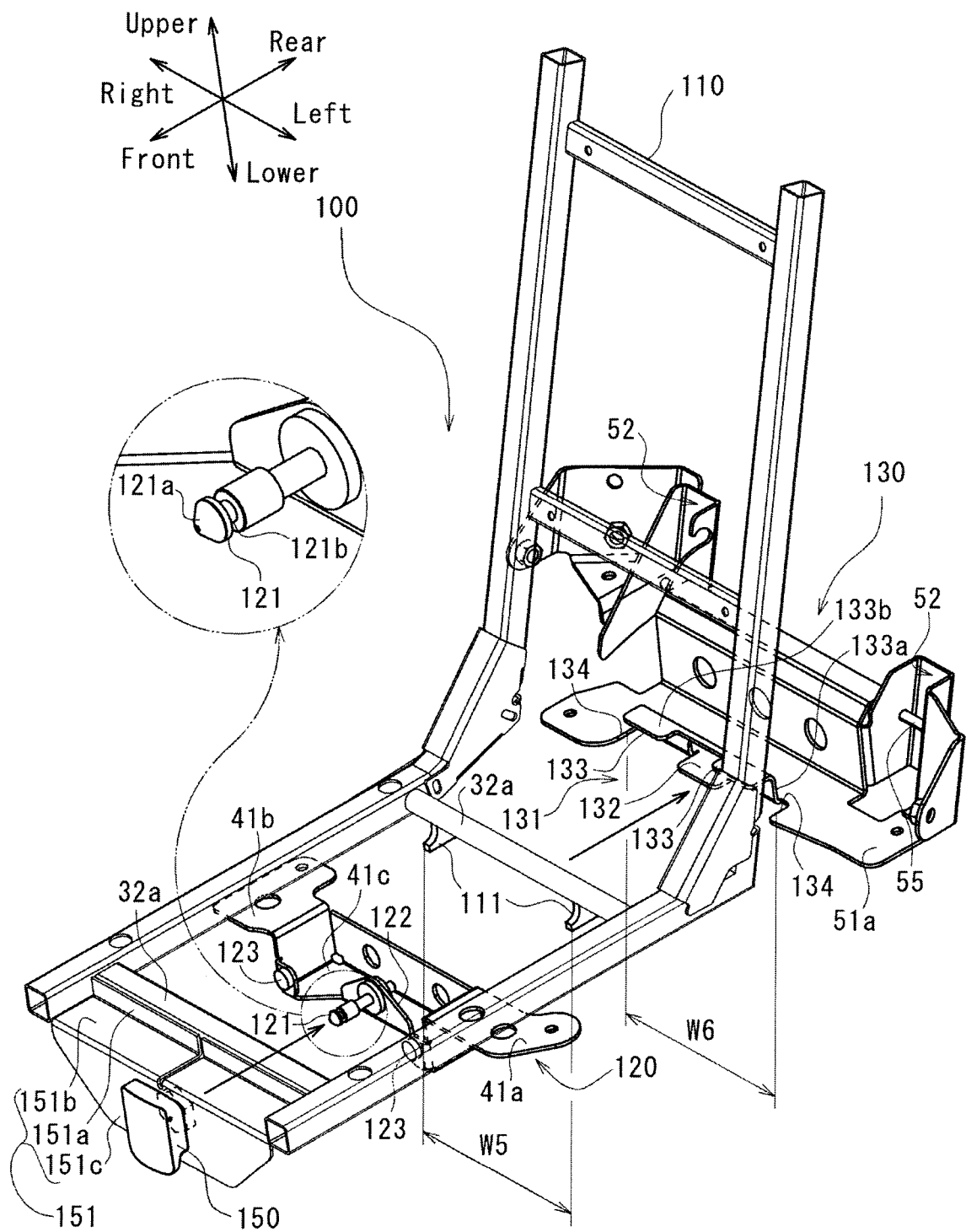
FIG. 9 is a perspective view of a seat mounting structure according to a second embodiment.

FIG. 9 depicts a mounting structure for a rear seat 100 according to the second embodiment. FIG. 9 depicts only a seat frame 110 of the rear seat 100, as well as a front mounting bracket 120 and a rear mounting bracket 130. The rear seat 100 according to the second embodiment is configured to be pressed substantially horizontally from ahead to the front mounting bracket 120 and the rear mounting bracket 130 to be positioned and fixed. Unlike the first embodiment, the seat cushion (not depicted) needs not to be pulled downward.

(Seat Frame 110)

The seat frame 110 is different from the seat frame 30 according to the first embodiment in positioned-portions and a fixed-portion. Specifically, the seat frame 110 includes, as the positioned-portions, a pair of left and right positioning plates 111 in place of the pair of left and right positioning pins 34, and as the fixed-portion, a locking device 150 in place of the seat striker 36.

The seat frame 110 includes a front bottom cross pipe 32*a* to which the locking device 150 is attached by means of a bracket 151. The mounting bracket 151 has a base portion 151*a* attached by welding or the like to the front surface of the front bottom cross pipe 32*a*, a horizontal face portion 151*b* extending horizontally and forward from the lower end of the base portion 151*a*, and a front face portion 151*c* extending downward from the front end of the horizontal face portion 151*b*. The locking device 150 is attached to the front face portion 151*c*.

The seat frame 110 includes a rear bottom cross pipe 32*a* configured by a round pipe. The pair of left and right positioning plates 111 is firmly fixed by welding or the like to the lower surface of the rear bottom cross pipe 32*a*. The positioning plates 111 are tabular members extending anteroposteriorly within planes perpendicular to the vehicle width direction. The pair of left and right positioning plates 111 is disposed such that outer surfaces in the width direction have an outer width W5 therebetween.

(Front Mounting Bracket 120)

The front mounting bracket 120 includes a lock pin 121 in place of the fixing portion 42 according to the first embodiment. The front mounting bracket 120 has a front face portion 122 extending upward from the front end of the lower face portion 41*c*, and the lock pin 121 is attached to the front face portion 122. The lock pin 121 extends anteroposteriorly through the front face portion 122, and includes a conical portion 121*a* tapered toward the front end and a radially reduced portion 121*b* provided behind the conical portion 121*a*.

The front mounting bracket 120 has a pair of left and right side face portions vertically connecting from the first flange 41*a* and the second flange 41*b* to the lower face portion 41*c*. The front mounting bracket 120 has portions that extend inward in the width direction from front edges of the side face portions and each have a front surface provided with a damper 123. The damper 123 is an elastic member made of rubber or the like.

(Rear Mounting Bracket 130)

The rear mounting bracket 130 includes a second positioning portion 131 at a front cut away portion provided at the center in the width direction of the base flange 51*a*. The second positioning portion 131 includes a lower positioning portion 132 positioned at the center in the width direction of the base flange 51*a*, a pair of left and right upper rear positioning portions 133 positioned outside in the width direction of the lower positioning portion 132, and a pair of left and right laterally positioning portions 134 positioned further outside in the width direction of the upper rear positioning portions 133.

The lower positioning portion 132 extends forward from the front edge of the base flange 51*a*. The upper rear positioning portions 133 each have a rear face portion 133*a* extending upward from the front edge of the base flange 51*a*, and an upper face portion 133*b* extending forward from the upper end of the rear face portion 133*a*. The laterally positioning portions 134 are configured by inner edges of the cut-away portion of the base flange 51*a*. In a side view, the lower positioning portion 132 and the upper rear positioning portions 133 configure a cornered U shape portion opened forward.

The lower positioning portion 132 and the upper face portion 133*b* of each of the upper rear positioning portions 133 have a vertical distance therebetween substantially equal to or slightly larger than a diameter of the rear bottom cross pipe 32*a*. The pair of left and right laterally positioning portions 134 has a transverse inner width W6 therebetween substantially equal to or slightly larger than the outer width W5 of the pair of left and right positioning plates 111.

Specifically, when the rear bottom cross pipe 32*a* of the seat frame 110 is pressed from ahead to be assembled to the second positioning portion 131, the bottom cross pipe 32*a* is vertically fitted between the lower positioning portion 132 and the upper face portions 133*b* of the upper rear positioning portions 133 and the pair of left and right positioning plates 111 is fitted between the pair of left and right laterally positioning portions 134. If the rear bottom cross pipe 32*a* is assembled to be in contact with the rear face portions 133*a* of the upper rear positioning portions 133, the seat frame 110 is positioned at the bottom cross pipe 32*a* vertically, transversely, and anteroposteriorly with respect to the second positioning portion 131 of the rear mounting bracket 130.

The seat frame 110 is positioned by, except for the positioning due to the cut-away portions 54, the positioning portions 52 and the connection pins 55 as in the first embodiment. The seat frame can alternatively be configured not to be positioned by the positioning portions 52 and the connection pins 55 but to be positioned only by the second positioning portion 131.

(Locking Device 150)

Figure 10A:
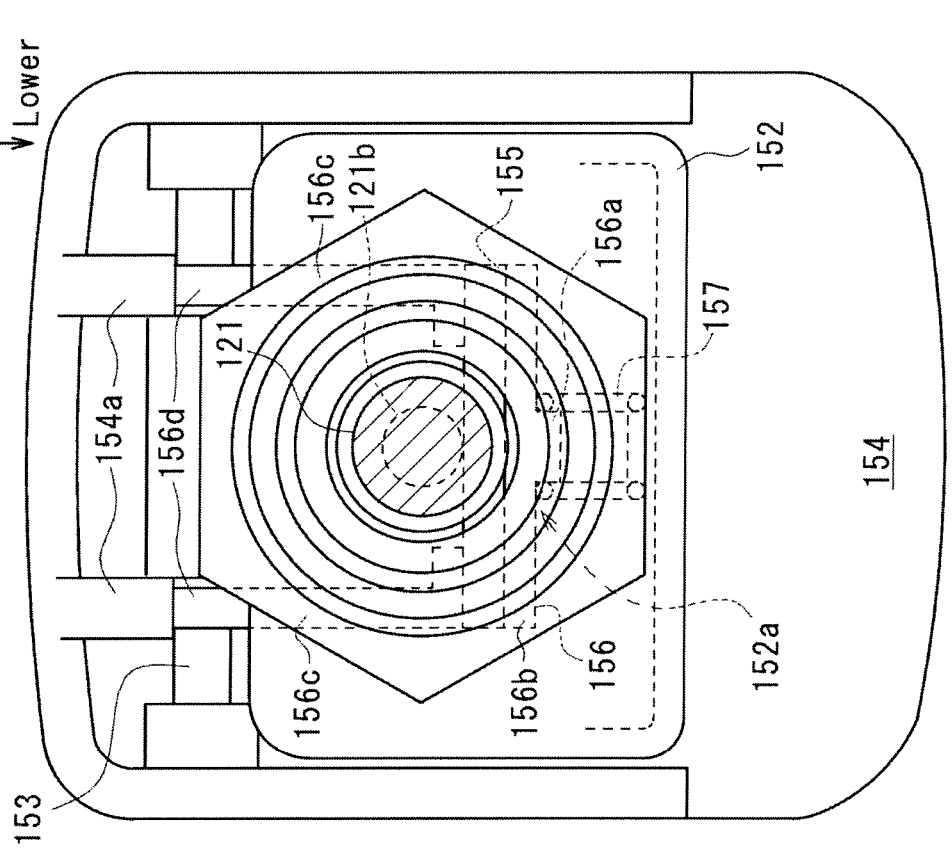
FIG. 10A is a side view of a fixed-portion.
Figure 10B:
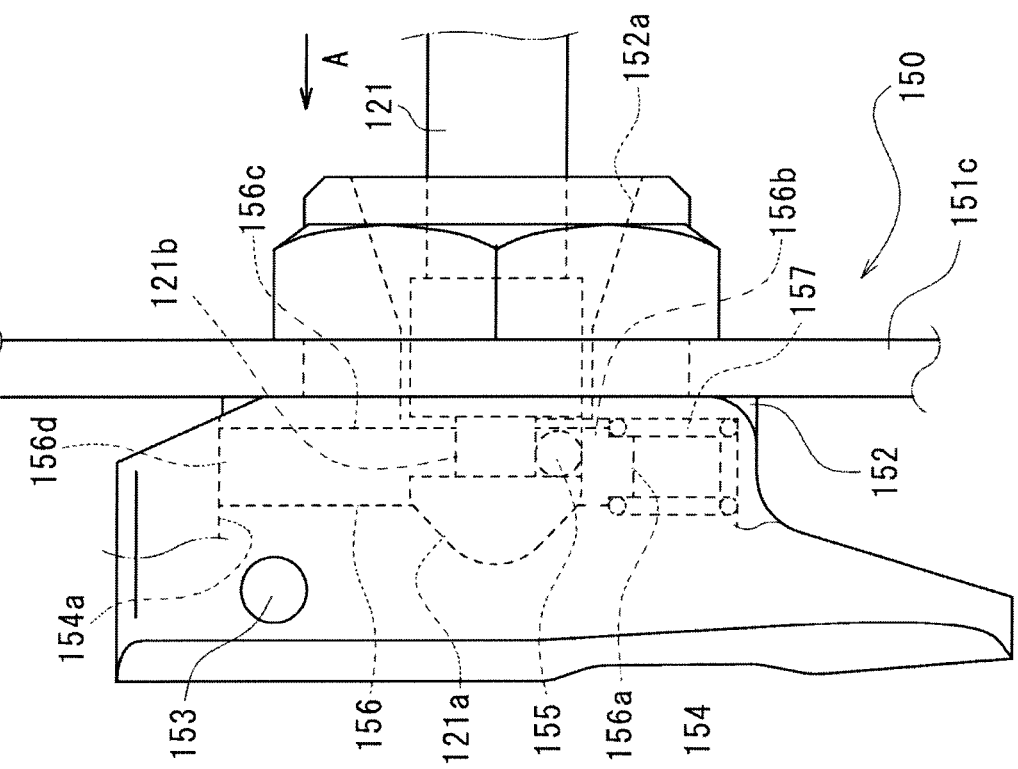
FIG. 10B is a view along an arrow A indicated in FIG. 10A, of the fixed-portion.

FIG. 10A is an enlarged side view of the locking device 150 and the vicinity thereof. FIG. 10B is a rear view along an arrow A indicated in FIG. 10A. FIG. 10B does not depict the bracket 151 for better depiction. The locking device 150 is configured to engage with the radially reduced portion 121*b* of the lock pin 121 inserted from behind when the rear seat 100 is mounted to the front mounting bracket 120 and the rear mounting bracket 130.

The locking device 150 includes a locking device body 152 attached to the front face portion 151*c* of the bracket 151, and a grip portion 154 attached to the locking device body 152 so as to be rotatable forward and backward about a rotary shaft 153.

The locking device body 152 is provided with a lock pin insertion hole 152a anteroposteriorly penetrating the locking device body 152. The lock pin 121 is inserted from behind to the lock pin insertion hole 152a when the rear seat 100 is assembled to the front mounting bracket 120. The locking device body 152 is provided therein with an engagement pin 155 engaging with the radially reduced portion 121b of the lock pin 121, a pin holder 156 retaining the engagement pin 155, and a coil spring 157 biasing the pin holder 156 to cause the engagement pin 155 to engage with the radially reduced portion 121b.

The engagement pin 155 is a columnar bar member disposed to anteroposteriorly correspond to the radially reduced portion 121b of the lock pin 121 inserted from behind to the locking device 150 and extending transversely across the lock pin 121 in a rear view depicted in FIG. 10B. The engagement pin 155 has an outer diameter substantially equal to or slightly smaller than the axial width of the radially reduced portion 121b.

The engagement pin 155 is biased upward by the coil spring 157 via the pin holder 156. When the lock pin 121 is inserted to the locking device 150, the engagement pin 155 is in contact from below with the outer periphery of the radially reduced portion 121b and is located at a lock position to engage with the radially reduced portion 121b.

The pin holder 156 has a substantially U shape opened upward in the rear view depicted in FIG. 10B, and is provided at the lower end with a projection 156a extending downward. The U shape portion of the pin holder 156 has a bottom 156b supporting respective ends of the engagement pin 155. The U shape portion of the pin holder 156 has respective lateral ends 156c disposed laterally aside the lock pin insertion hole 152a and extending upward, and upper ends 156d positioned behind the rotary shaft 153.

The coil spring 157 is attached to the projection 156a and is elastically provided vertically between the bottom 156b of the U shape portion of the pin holder 157 and the locking device body 152 to bias the pin holder 156 upward.

The rotary shaft 153 is disposed in an upper front portion of the locking device body 152 and extends transversely.

The grip portion 154 extends vertically, and has an area that is close to the upper end and is attached rotatably to the locking device body 152 via the rotary shaft 153. The grip portion 154 is biased backward by an elastic member (not depicted) and has a rear edge in contact with the front face portion 151c of the bracket 151. The grip portion 154 has a rear upper end provided with a pair of left and right projections 154a projecting downward. The pair of left and right projections 154a is disposed to be in contact from above with the pair of left and right upper ends 156d of the pin holder 156. The pair of left and right projections 154a is positioned above and behind the rotary shaft 153.

As depicted in FIG. 9, in order to assemble the rear seat 100 to the front mounting bracket 120 and the rear mounting bracket 130, the rear seat 100 is accessed from ahead to these brackets 120 and 130 and is shifted backward substantially horizontally. The rear bottom cross pipe 32a of the seat frame 110 is inserted from ahead to the second positioning portion 131, and is initially positioned vertically and transversely by the lower positioning portion 132, the upper rear positioning portions 133, and the pair of left and right laterally positioning portions 134.

Figure 11:
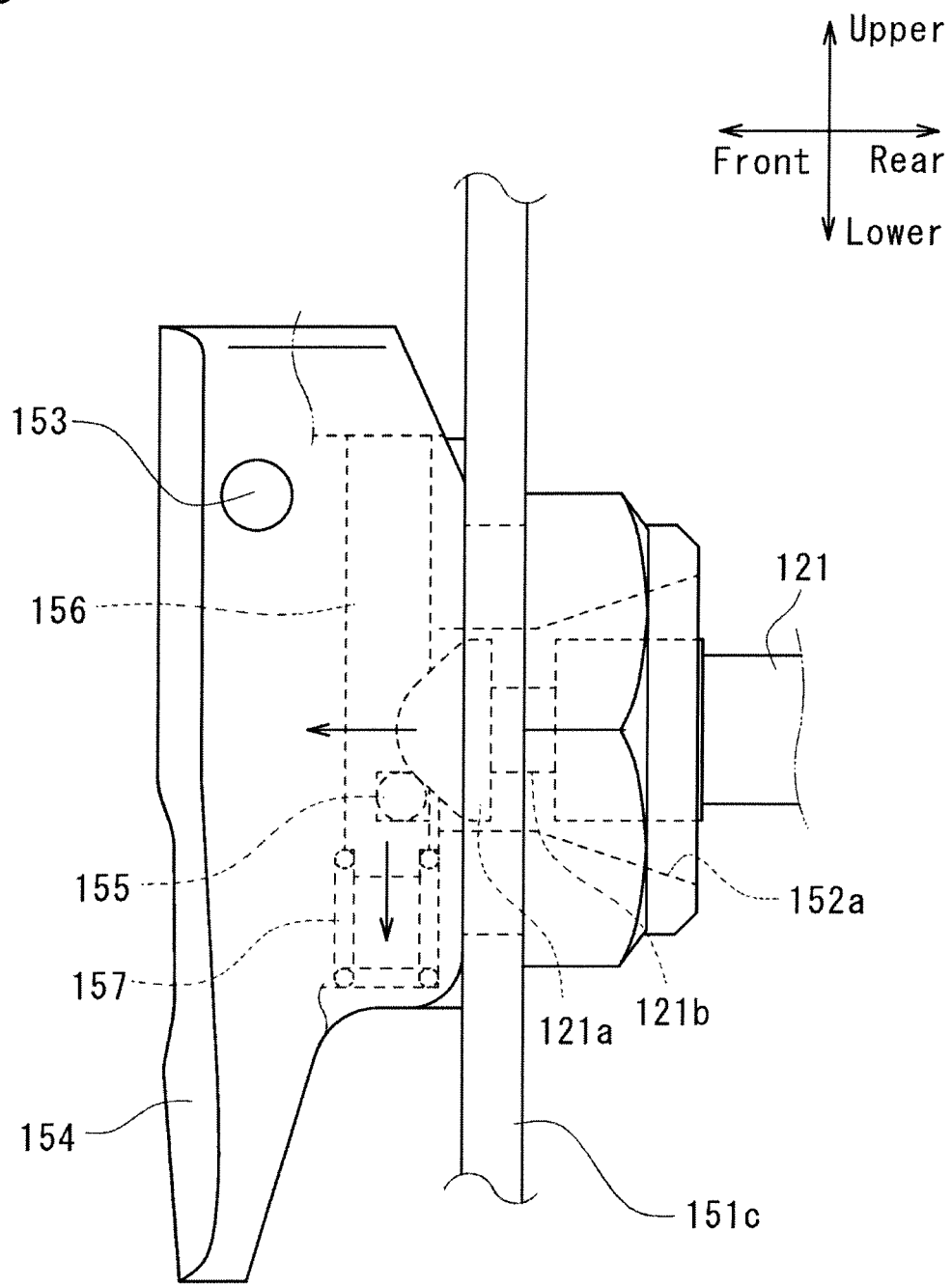
FIG. 11 is a side view of a locking device in a fixed state.

As depicted in FIG. 11, at the front mounting bracket 120, the lock pin 121 is inserted from behind to the locking device 150 of the rear seat 100. The conical portion 121a at the distal end of the lock pin 121 subsequently comes into contact with the engagement pin 155 that is pressed downward against biasing force of the coil spring 157 to withdraw from the lock pin insertion hole 152a. When the lock pin 121 is further pressed into the locking device 150 and the radially reduced portion 121b is positioned correspondingly to the engagement pin 155, the engagement pin 155 is shifted upward by the biasing force of the coil spring 157 to come into contact with the outer periphery of the radially reduced portion 121b. In other words, the engagement pin 155 is positioned at the lock position and the engagement pin 155 anteroposteriorly locks the lock pin 121.

As depicted in FIG. 9, at the rear bracket 130, the rear face portion 133a of the second positioning portion 131 restricts further backward shift of the bottom cross pipe 32a of the seat frame 110. The rear seat 100 is thus positioned vertically, transversely, and anteroposteriorly as well as is fixed anteroposteriorly by the front mounting bracket 120 and the rear mounting bracket 130. In this state, the front face portion 151c of the bracket 151 is in contact with the front mounting bracket 120 with the dampers 123 interposed therebetween, and the seat frame 110 is elastically supported anteroposteriorly.

Figure 12:
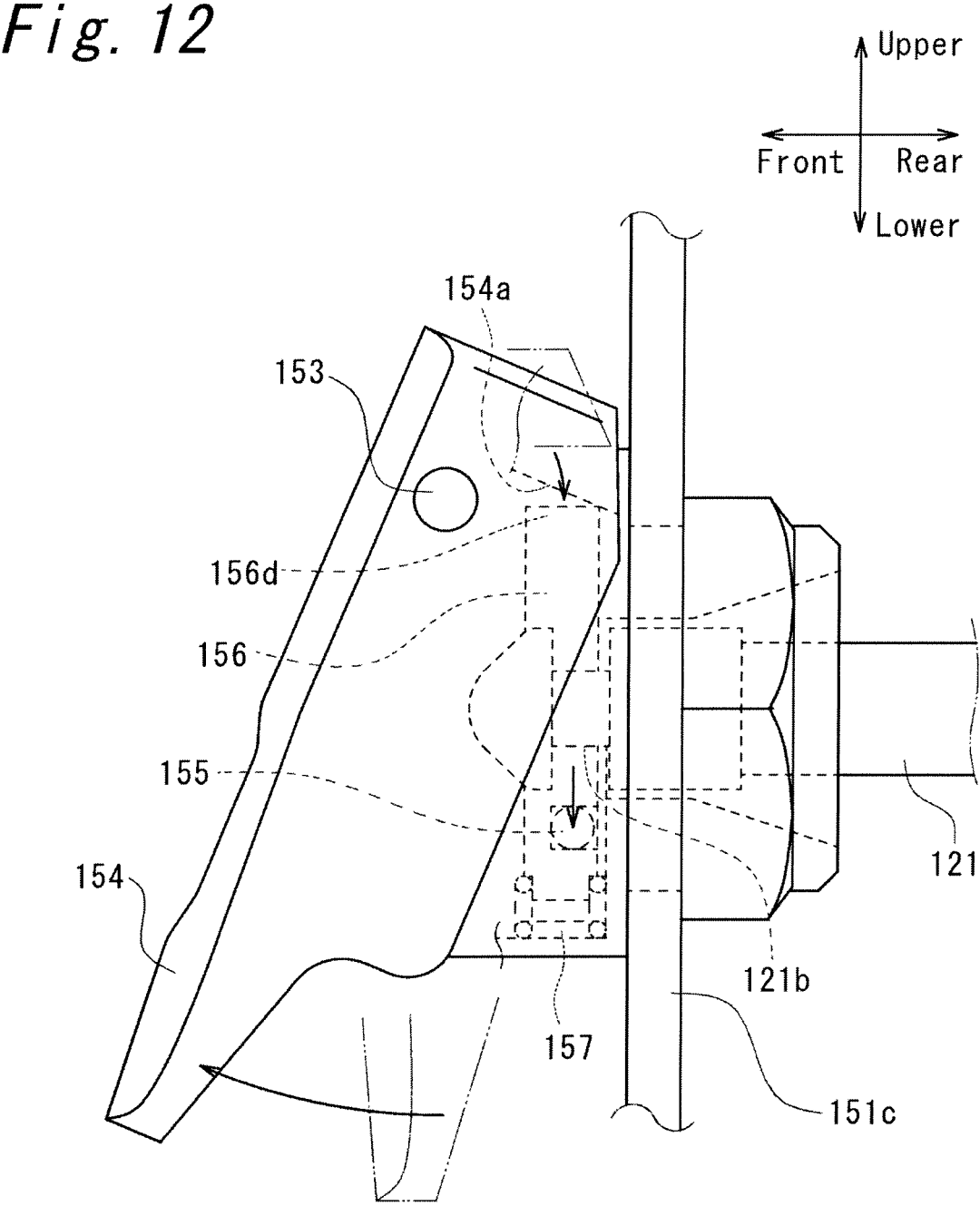
FIG. 12 is a side view of the locking device in an unfixed state.

As depicted in FIG. 12, when the grip portion 154 is rotated forward to withdraw the engagement pin 155 downward from the lock position, the lock pin 121 is disengaged. The rear seat 100 is then extracted forward and is dismounted from the front mounting bracket 120 and the rear mounting bracket 130. Specifically, when the grip portion 154 is rotated forward, the upper ends 156d of the pin holder 156 are pressed downward via the projections 154a against the biasing force of the coil spring 157. The engagement pin 155 is accordingly shifted downward from the radially reduced portion 121b, so that the lock pin 121 is disengaged from the engagement pin 155.

According to the second embodiment, the rear seat 100 as vehicle equipment is shifted backward substantially horizontally from ahead of the front mounting bracket 120 and the rear mounting bracket 130, so as to be positioned vertically, transversely, and anteroposteriorly as well as readily be fixed anteroposteriorly. Furthermore, the grip portion 154 of the locking device 150 is rotated forward to easily cancel lock of the locking device 150, so that the rear seat 100 is dismounted from the front mounting bracket 120 and the rear mounting bracket 130.

The mounting structure for vehicle equipment according to the second embodiment is applicable to various vehicle equipment such as the storage box, the storage plate, and the bench seat mentioned in the first embodiment.

The present invention can be modified or changed in various manners without departing from the spirit and scope of the present invention recited in the following claims.

What is claimed is:
1. A mounting structure for vehicle equipment, the structure comprising:
   a vehicle body frame;
   a bracket attached to the vehicle body frame; and
   a plurality of different types of vehicle equipment including at least one seat;
   wherein the bracket and the plurality of vehicle equipment are configured so that each item of the plurality of different types of vehicle equipment is interchangeably and removably mountable to the bracket so as to be replaceable with another item of the plurality of different types of vehicle equipment.

2. The mounting structure for vehicle equipment according to claim 1, wherein
the bracket includes:
a positioning portion positioning the vehicle equipment; and
a fixing portion fixing the vehicle equipment, and
the vehicle equipment includes:
a positioned-portion positioned by the positioning portion; and
a fixed-portion fixed by the fixing portion.

3. The mounting structure for vehicle equipment according to claim 2,
wherein the fixed-portion is positioned at a front portion of the vehicle equipment.

4. The mounting structure for vehicle equipment according to claim 3,
wherein
the positioning portion has a pair of left and right side face portions extending in an anteroposterior direction, and at least one of the pair of left and right side face portions has a front edge provided with a cut-away portion opened forward,
the positioned-portion is configured as an equipment extension disposed at a rear portion of the vehicle equipment and extending in at least one of the anteroposterior direction and a vertical direction, and the equipment extension has a pin extending in a vehicle width direction,
in a state where the vehicle equipment is mounted to the bracket, the equipment extension is inserted between the pair of left and right side face portions so that the positioned-portion is positioned in a vehicle width direction with respect to the positioning portion, and
the pin is inserted from ahead to the cut-away portion so that the positioned-portion is positioned in the anteroposterior direction and in the vertical direction with respect to the positioning portion.

5. The mounting structure for vehicle equipment according to claim 4, wherein
in the state where the positioned-portion of the vehicle equipment is positioned by the positioning portion, the fixed-portion is inserted to the fixing portion in the vertical direction to be fixed in the vertical direction.

6. The mounting structure for vehicle equipment according to claim 3, wherein
the positioning portion has a cornered U shape portion opened forward in a side view, and a pair of left and right edges configured by lateral ends of a tabular member extending anteroposteriorly, the positioned-portion includes a pipe member disposed at a rear portion of the vehicle equipment and extending in a vehicle width direction, and a pair of left and right equipment extensions attached to a lower surface of the pipe member and extending anteroposteriorly,
in a state where the vehicle equipment is mounted to the bracket,
the pipe member is inserted from ahead to the cornered U shape portion to be positioned vertically and anteroposteriorly, and
the pair of left and right equipment extensions is inserted between the pair of left and right edges to be positioned transversely.

7. The mounting structure for vehicle equipment according to claim 6, wherein
in the state where the positioned-portion of the vehicle equipment is positioned by the positioning portion, the fixed-portion is inserted anteroposteriorly to the fixing portion to be fixed anteroposteriorly.

8. The mounting structure for vehicle equipment according to claim 2, wherein
the positioning portion is configured by at least one vehicle component positioned around the vehicle equipment mounted to the bracket,
the positioned-portion is configured by an outer peripheral of the vehicle equipment mounted to the bracket, and
the vehicle equipment is positioned horizontally with the outer peripheral being positionally restricted by the at least one vehicle component.

9. The mounting structure for vehicle equipment according to claim 1, wherein
the plurality of vehicle equipment includes at least one of a storage plate or a storage box.

10. The mounting structure for vehicle equipment according to claim 1, wherein
the vehicle equipment is placed on the vehicle body frame and has contact portions in contact with the vehicle body frame, and at least one of the contact portions is provided with an elastic member.

11. A mounting structure for vehicle equipment, the structure comprising:
a vehicle body frame;
a bracket attached to the vehicle body frame;
a seat;
a storage box;
a storage plate; and
a bench seat,
wherein the bracket, the seat, the storage box, the storage plate, and the bench seat are configured so that each of the seat, the storage box, the storage plate, and the bench seat is interchangeably and removably mountable to the bracket so as to be replaceable with any other of the seat, the storage box, the storage plate, and the bench seat.

12. The mounting structure for vehicle equipment according to claim 11, wherein
the bracket includes:
a positioning portion positioning any one of the seat, the storage box, the storage plate, and the bench seat; and
a fixing portion fixing any one of the seat, the storage box, the storage plate, and the bench seat, and
any one of the seat, the storage box, the storage plate, and the bench seat includes:
a positioned-portion positioned by the positioning portion; and
a fixed-portion fixed by the fixing portion.

13. The mounting structure for vehicle equipment according to claim 12,
wherein the fixed-portion is positioned at a front portion of any one of the seat, the storage box, the storage plate, and the bench seat.

14. The mounting structure for vehicle equipment according to claim 13, wherein
the positioning portion has a pair of left and right side face portions extending in an anteroposterior direction, and at least one of the pair of left and right side face portions has a front edge provided with a cut-away portion opened forward,
the positioned-portion is configured as an equipment extension disposed at a rear portion of any one of the seat, the storage box, the storage plate, and the bench seat and extending in at least one of the anteroposterior direction and a vertical direction, and the equipment extension has a pin extending in a vehicle width direction, in a state where any one of the seat, the storage box, the storage plate, and the bench seat is mounted to the bracket, the equipment extension is inserted between the pair of left and right side face portions so that the positioned-portion is positioned in a vehicle width direction with respect to the positioning portion, and the pin is inserted from ahead to the cut-away portion so that the positioned-portion is positioned in the anteroposterior direction and in the vertical direction with respect to the positioning portion.

15. The mounting structure for vehicle equipment according to claim 14, wherein in the state where the positioned-portion of any one of the seat, the storage box, the storage plate, and the bench seat is positioned by the positioning portion, the fixed-portion is inserted to the fixing portion in the vertical direction to be fixed in the vertical direction.

* * * * *